July 22, 1958  A. C. ANDERSON ET AL  2,843,947
BULLDOZER AND LOADER ATTACHMENT.
Filed June 11, 1953  6 Sheets-Sheet 1
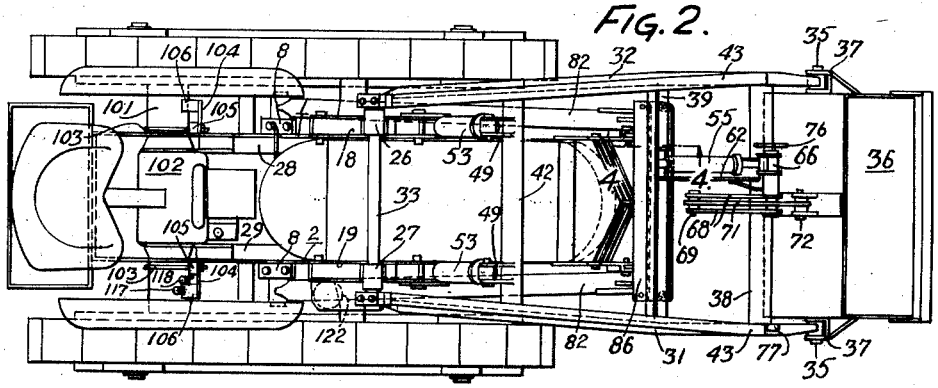
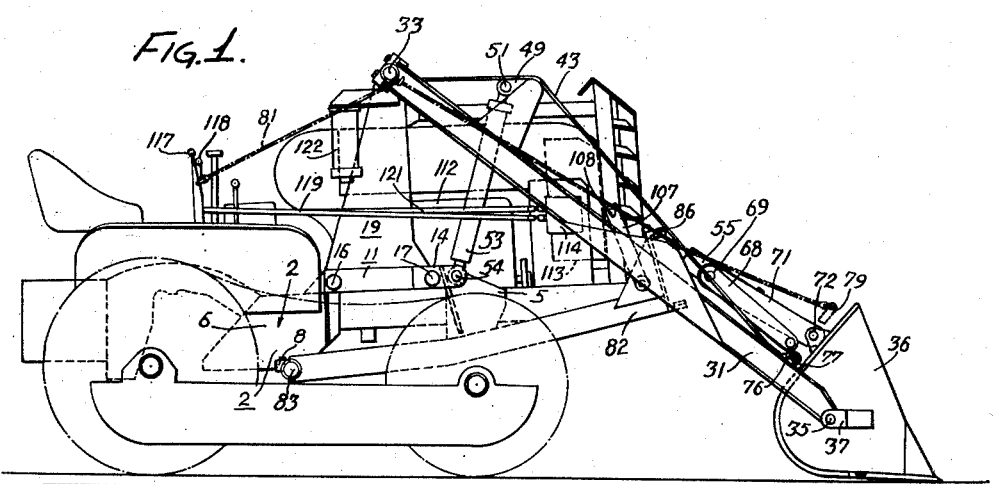
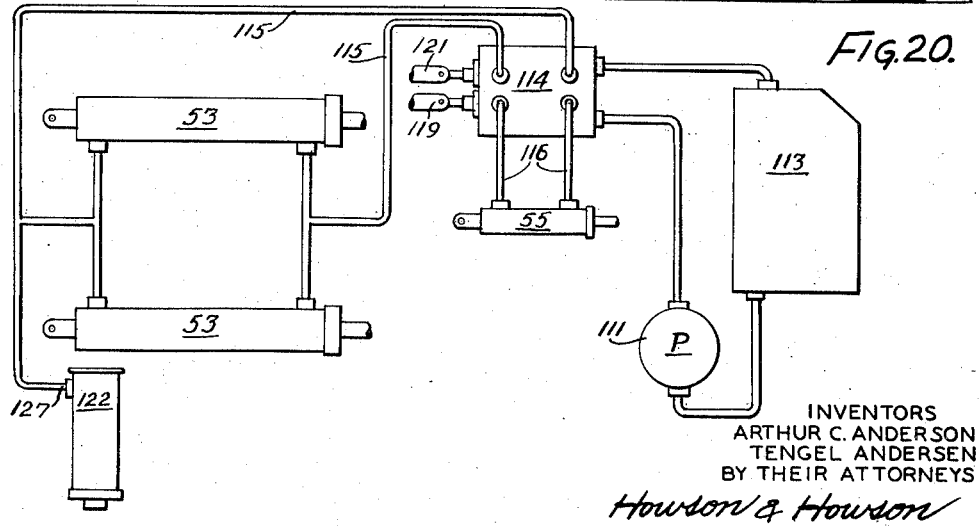
INVENTORS
ARTHUR C. ANDERSON
TENGEL ANDERSEN
BY THEIR ATTORNEYS
Howson & Howson July 22, 1958  A. C. ANDERSON ET AL  2,843,947
BULLDOZER AND LOADER ATTACHMENT.
Filed June 11, 1953  6 Sheets-Sheet 2
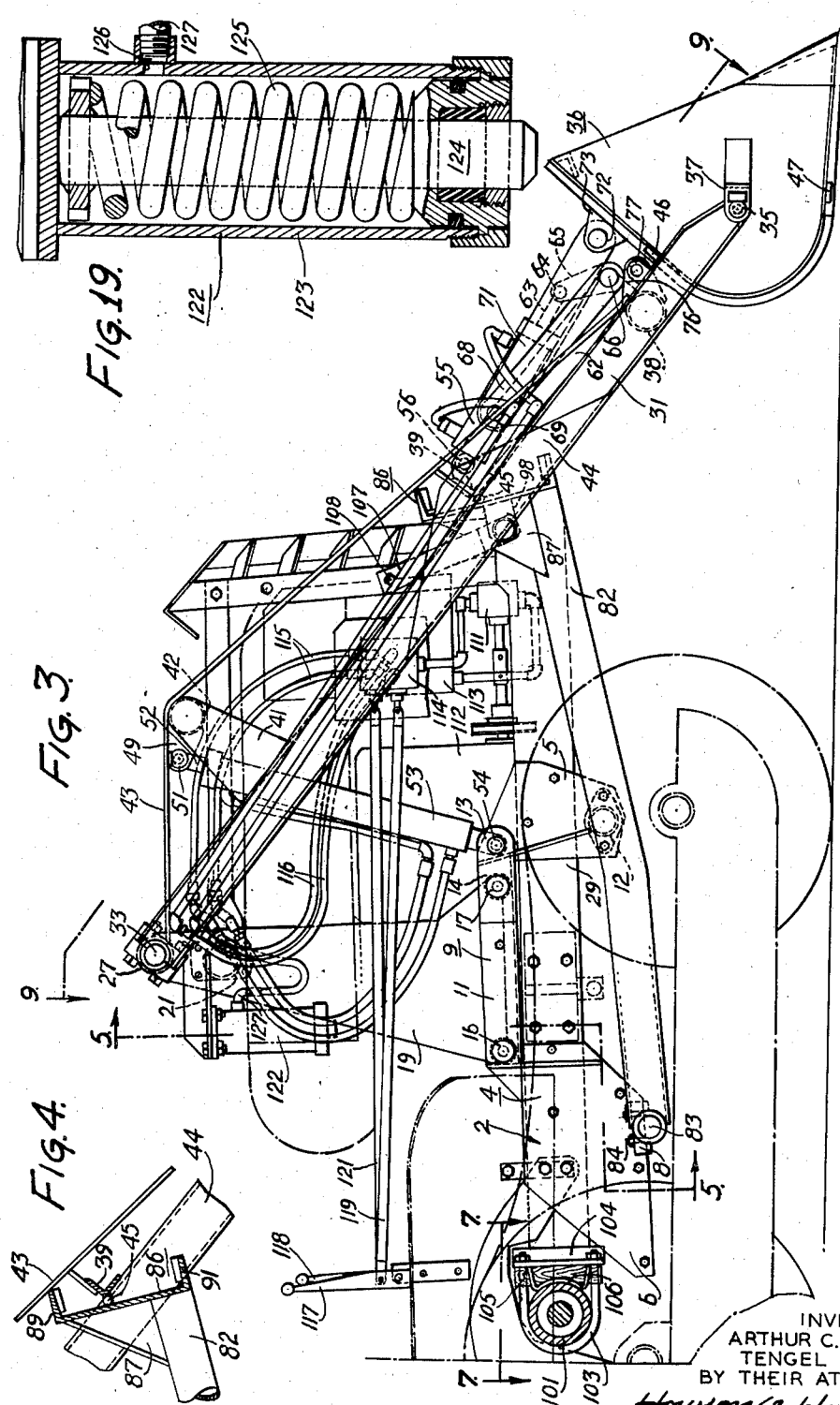
INVENTORS
ARTHUR C. ANDERSON
TENGEL ANDERSEN
BY THEIR ATTORNEYS
Howson & Howson July 22, 1958 A. C. ANDERSON ET AL 2,843,947
BULLDOZER AND LOADER ATTACHMENT.
Filed June 11, 1953 6 Sheets-Sheet 3
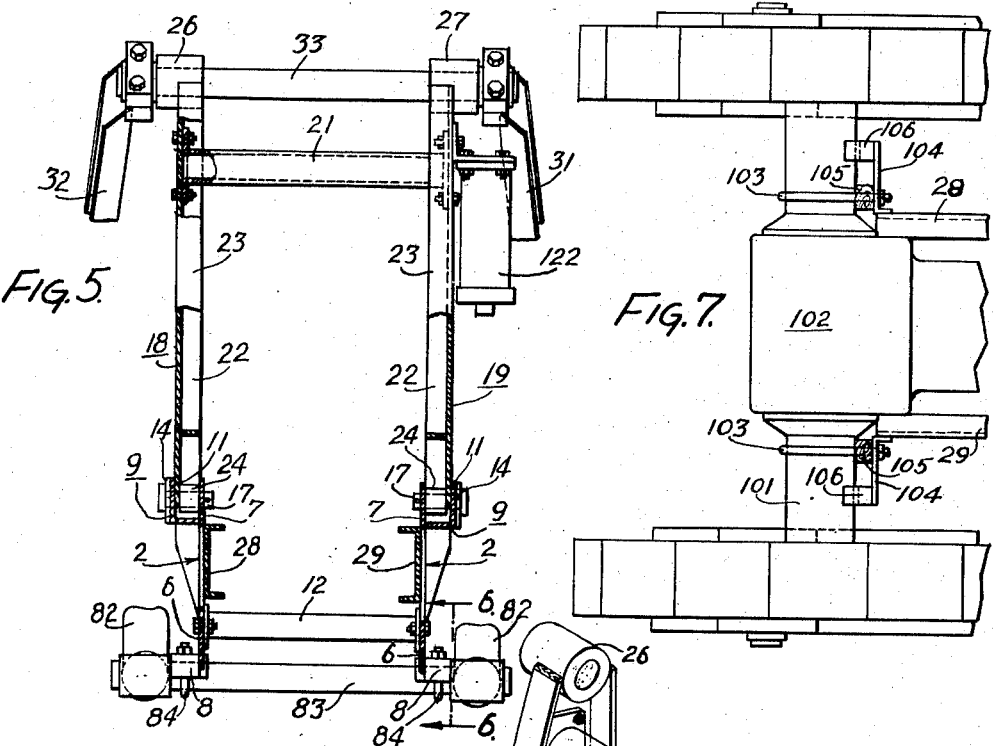
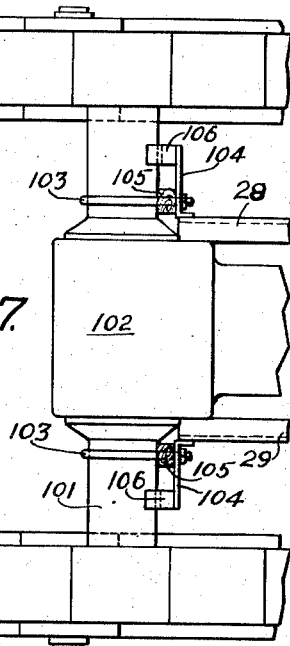
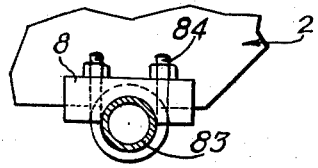
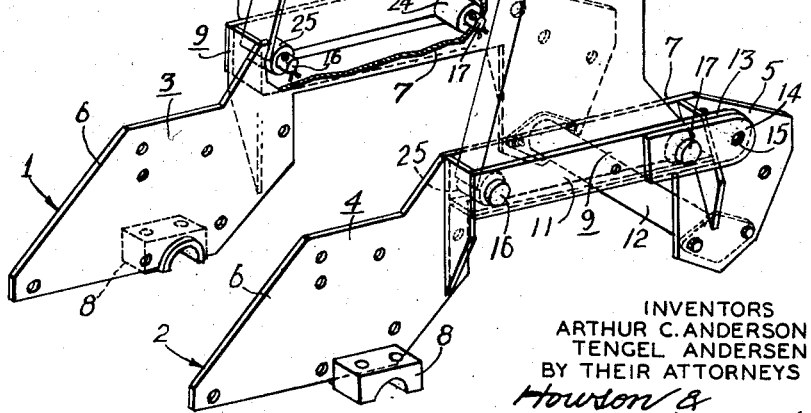
INVENTORS
ARTHUR C. ANDERSON
TENGEL ANDERSEN
BY THEIR ATTORNEYS
Howson & Howson

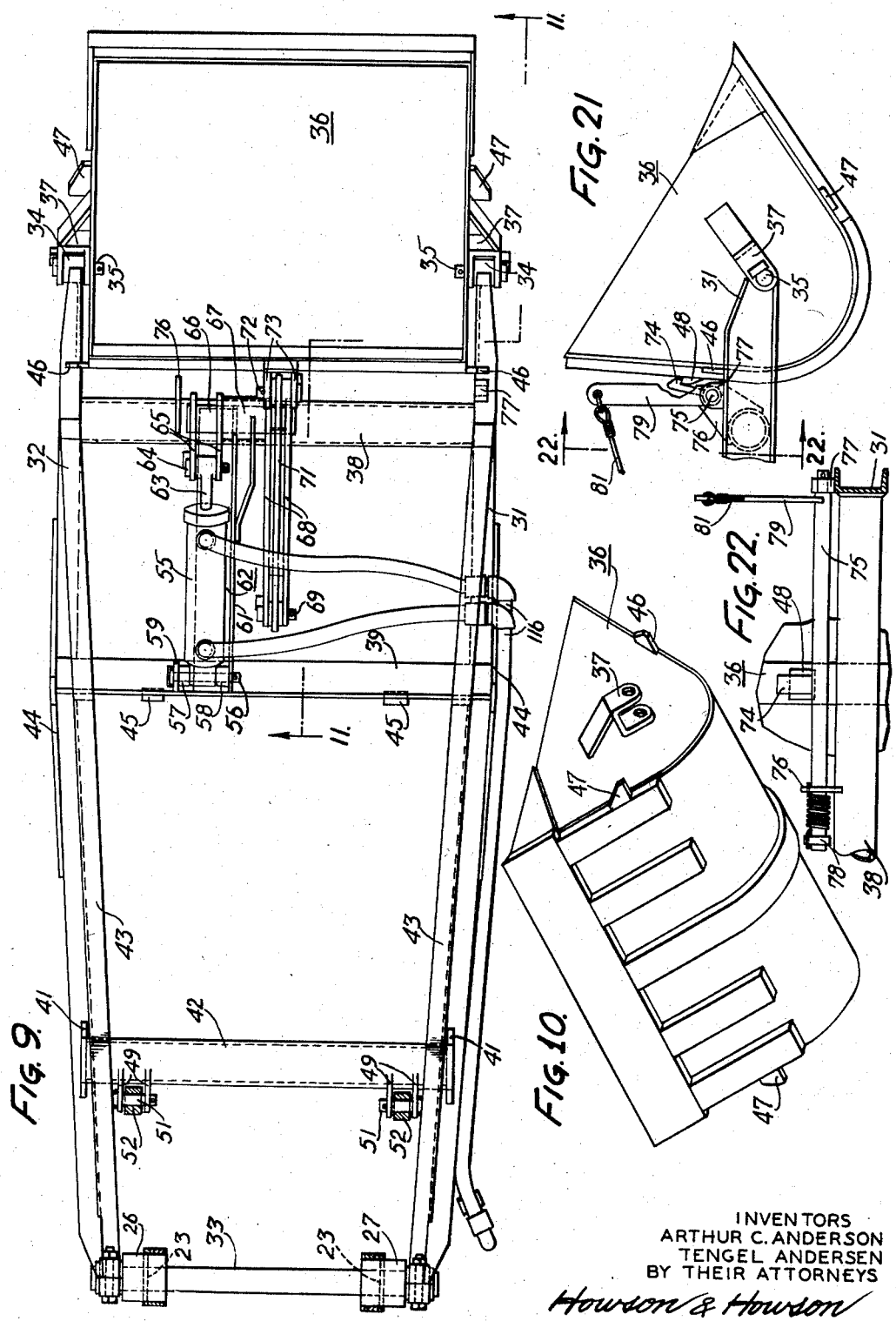

July 22, 1958 — A. C. ANDERSON ET AL — 2,843,947
BULLDOZER AND LOADER ATTACHMENT.
Filed June 11, 1953 — 6 Sheets-Sheet 5
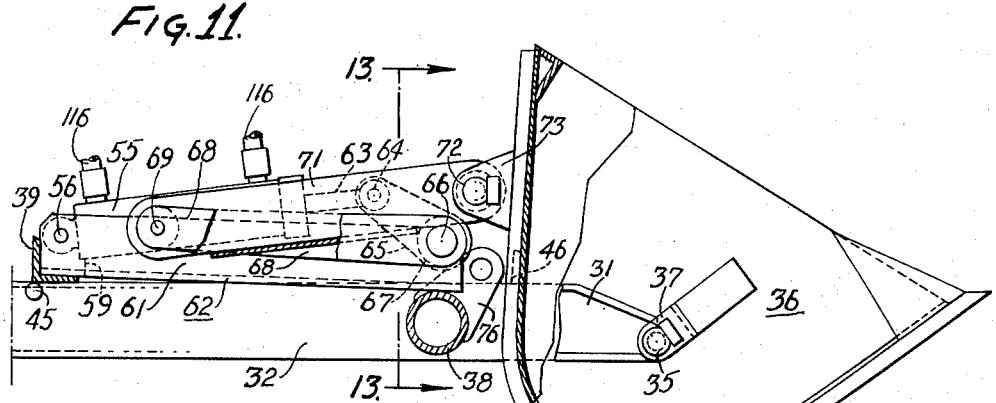
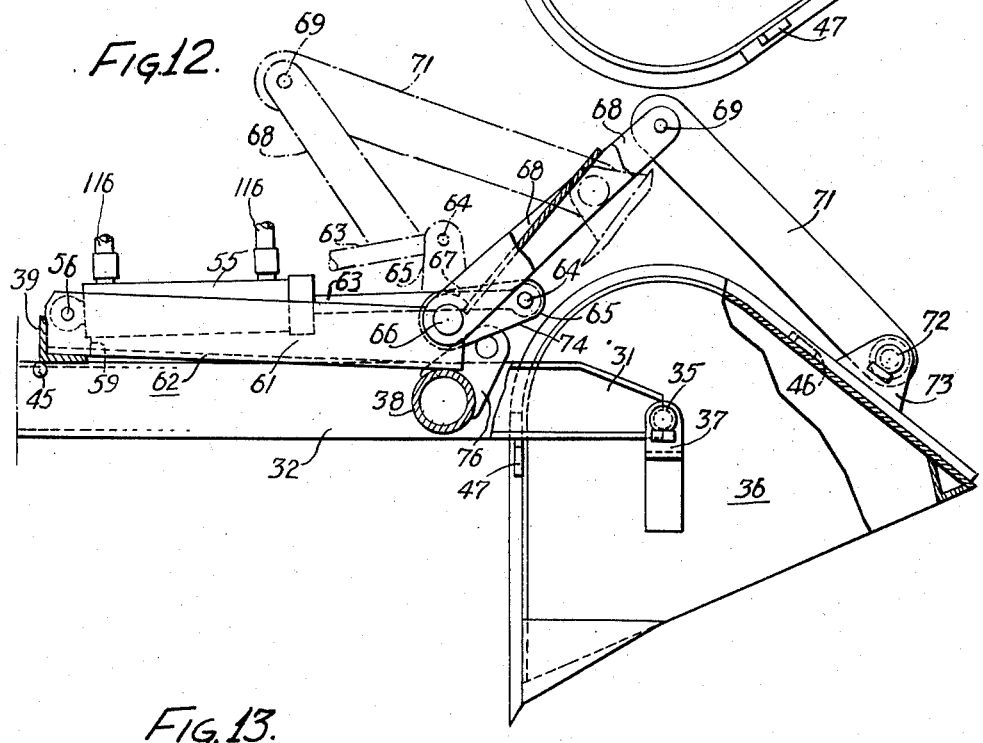
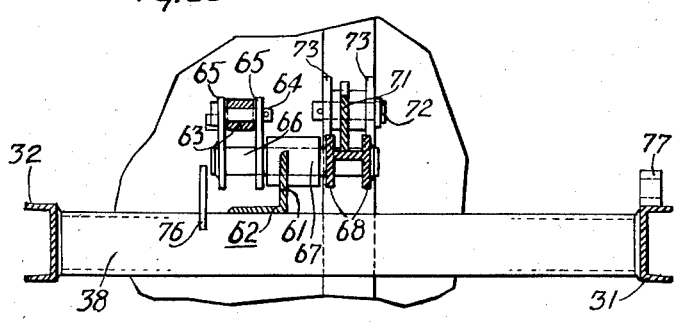
INVENTORS
ARTHUR C. ANDERSON
TENGEL ANDERSEN
BY THEIR ATTORNEYS
Howson & Howson July 22, 1958  A. C. ANDERSON ET AL  2,843,947
BULLDOZER AND LOADER ATTACHMENT.
Filed June 11, 1953  6 Sheets-Sheet 6
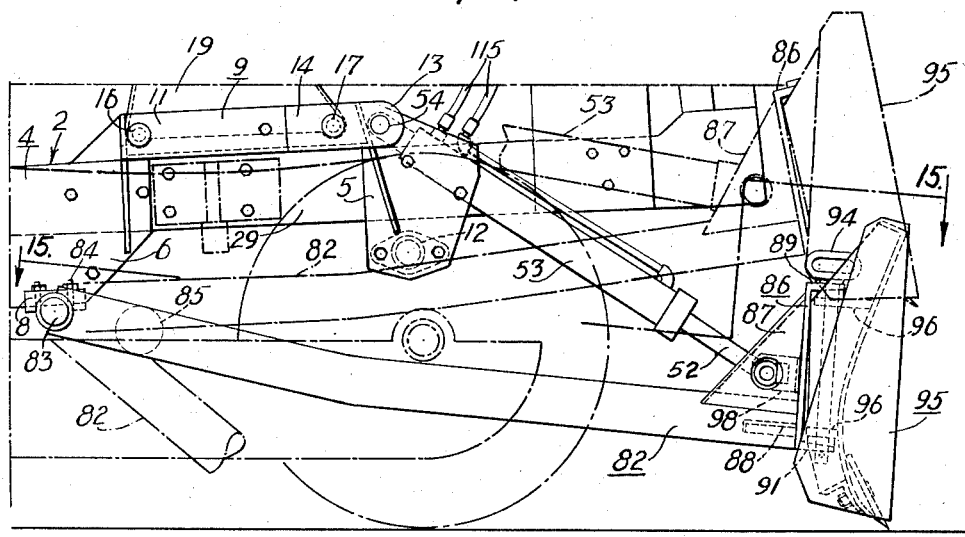
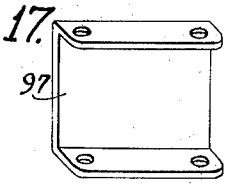
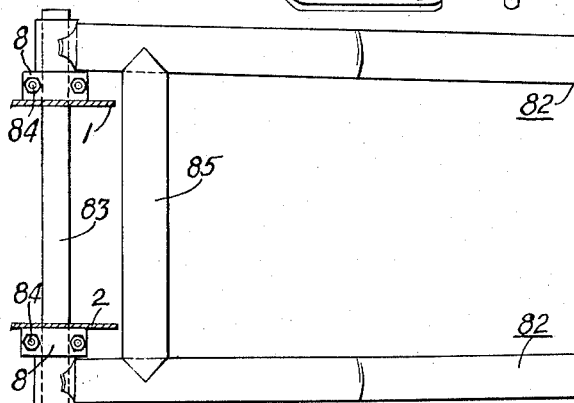
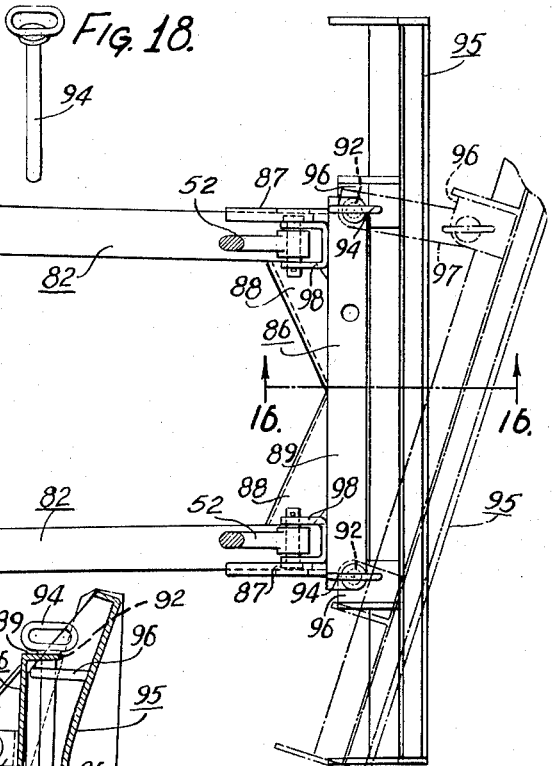
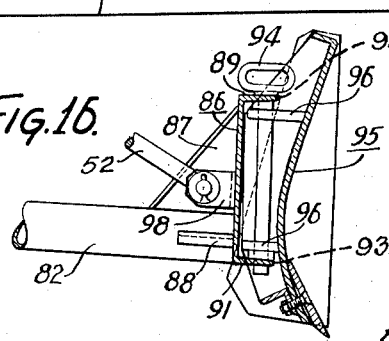
INVENTORS
ARTHUR C. ANDERSON
T. ENGEL ANDERSEN
BY THEIR ATTORNEYS
Howson & Howson

United States Patent Office 2,843,947
Patented July 22, 1958

2,843,947
BULLDOZER AND LOADER ATTACHMENT

Arthur C. Anderson and Tengel Andersen, Wildwood, N. J., assignors to A. C. Anderson, Inc., Wildwood, N. J., a corporation of New Jersey Application June 11, 1953, Serial No. 360,904

11 Claims. (Cl. 37—117.5)

This invention relates to loader and bulldozer attachments for tractors and a principal object of the invention is to provide an attachment wherein provision is made for both the loading and bulldozing functions.

Another object of the invention is to provide an attachment of the stated type which is characterized by simplicity and compactness of form, relative ease of attachment and detachment, and simplicity of changeover from the loading to the bulldozing functions.

The invention resides also in certain novel structural and mechanical features hereinafter described and illustrated in the attached drawings wherein:

Figure 1 is a side elevational view showing the attachment applied to a crawler tractor and conditioned for the loading function;

Figure 2 is a plan view of the mechanism illustrated in Figure 1;

Figure 3 is an enlarged fragmentary side elevational view showing details of the loading mechanism;

Figure 4 is a sectional view on the line 4—4, Figure 2;

Figure 5 is a sectional view on the line 5—5, Figure 3;

Figure 6 is a sectional view on the line 6—6, Figure 5;

Figure 7 is a fragmentary plan view from the line 7—7, Figure 3;

Figure 8 is a view in perspective of the frame of the attachment apart from the tractor;

Figure 9 is an enlarged top plan view from the line 9—9, Figure 3, showing the details of the loading unit;

Figure 10 is a view in perspective of the loading scoop;

Figure 11 is a sectional view on the line 11—11, Figure 9;

Figure 12 is a view corresponding to Figure 11 showing the scoop in the dumping position;

Figure 13 is a sectional view on the line 13—13, Figure 11;

Figure 14 is a fragmentary side elevational view illustrating details of the bulldozer unit;

Figure 15 is a sectional view on the line 15—15, Figure 14;

Figure 16 is a sectional view on the line 16—16, Figure 15;

Figure 17 is a view in perspective illustrating a detail of mechanical structure;

Figure 18 is a view in perspective of one of the bulldozer blade-retaining pins;

Figure 19 is a sectional view of an element of the hydraulic system;

Figure 20 is a diagrammatic view showing the hydraulic system;

Figure 21 is a fragmentary side elevational view showing a modification within the scope of the invention, and;

Figure 22 is a sectional view on the line 22—22, Figure 21.

With reference to the drawings and more particularly to Figure 8, the attachment forming the subject of the present invention comprises a frame which is adapted for attachment in the present instance to a tractor of the crawler type and which forms the entire support for the separate bulldozing and loader units of the attachment. As shown in Figure 8 this rigid frame consists of opposite side members 1 and 2 which are identical in form except that one is the opposite of the other. Each of these frame elements consists of a flat plate, 3 and 4 respectively, which comprises a front end section 5, a rear end section 6, and an intermediate section 7 which connects the end sections 5 and 6. To the outer faces of each of the end sections 6 is secured a box 8, the function of which will be hereinafter described. The corresponding face of each of the intermediate sections 7 has secured thereto an open-top box-like bracket 9 comprising an outer side wall 11, the function of these brackets being also described below. The lower ends of the front end sections 5 of the plates 3 and 4 are rigidly connected by transverse bar 12. It will be noted also that the plates 11 of the brackets 9 are extended at their forward ends, as indicated at 13, 13 and are reinforced by an outer plate 14, the projecting ends of the plates being provided in each case with an aperture 15.

Mounted in each of the box sections 9 and supported between the body plate of the intermediate section 7 and the relatively spaced wall 11 is a pair of pins 16 and 17. These pins provide supports for the lower end of a pair of upright brackets 18 and 19 which are connected at their upper ends by a transverse bar 21. Each of the brackets comprises downwardly divergent front and rear members 22 and 23, and the lower end of each of these members is attached by welding to a sleeve, 24 and 25 respectively, through which the pins 16 and 17 extend. The pins are detachably mounted in the box section so as to provide for attachment and detachment of the brackets 18 and 19 to the side members 1 and 2. At the upper extremity of each of the brackets 18 and 19 is a bearing sleeve, 26 and 27 respectively, the function of which will be hereinafter described.

The frame structure described above and best illustrated in Figure 8 of the drawings is adapted to be secured to the side members 28 and 29 of the tractor as illustrated in Figures 3 and 5 and when thus attached forms a rigid frame which constitutes the primary support for the elements of the loader and bulldozer mechanism described below.

With reference to Figures 1 and 2 the loader unit comprises a boom consisting of a pair of arms 31 and 32 of channel section which are secured at their upper ends to a shaft 33 journaled in the sleeves 26 and 27 at the upper ends of the brackets 18, 19 previously described. At their opposite ends the arms are provided with sleeves 34, which receive pins 35 constituting a pivotal support for a bucket 36. As best shown in Figures 9 to 12 the side walls of the bucket are provided with bifurcated fixtures 37, 37 which embrace the respective sleeves 34 and through which the pins 35 extend to pivotally attach the bucket 36 to the arms 31 and 32.

Rearwardly of the bucket 36 the arms 31 and 32 are rigidly connected by a tubular cross bar 38; and rearwardly of the bar 38 an angle bar 39 is secured to the tops of and connects the arms 31 and 32, as shown in Figures 3, 9, 11 and 12. Each of the arms 31 and 32 is also provided toward its upper or rear end with an upright flange 41, the upper ends of which are rigidly connected by a tubular cross bar 42. This latter cross bar forms a support for a pair of straps 43, the rear ends of which are attached, as by welding, to the rear ends of the arms 31 and 32 and the forward ends of which are similarly attached to the arms at points above the connecting bar 38. These straps thus act as tension struts to reinforce the arms against the heavy weights imposed by the bucket 36 when loaded.

The loader boom, which includes the arms 31 and 32 and the associated elements described above, constitutes a rigid structure of which one end is pivotally supported on the shaft 33 and the other end carries the bucket 36. It will be noted that each of the arms 31 and 32 of this structure are provided with an upstanding flange 44 to the inner side of which is attached, as by welding, one of the extremities of the angle bar 39. This latter bar carries at its lower rear corner a pair of cylindrical pads 45, 45, the function of which will be hereinafter described. It will be noted also that the bucket 36 is provided at the back and at each side with a projecting lug 46 which by engagement with the upper edges of the arms 31 and 32 limit the pivotal movement of the bucket in a counterclockwise direction as viewed in the drawing; and that the bucket at its forward side carries a corresponding pair of projecting lugs 47, 47 which perform a similar function in limiting the angular movement of the bucket in clockwise direction, all as shown in Figures 11 and 12.

With reference again to Figures 2 and 9, it will be noted that the cross bar 42 has projecting from the rear side thereof two sets of lugs 49, 49 to which are connected by pins 51 the outer ends of plungers 52, 52 of hydraulic cylinders 53, 53, these cylinders being pivotally attached respectively to the forward projecting ends 13 of the walls 11 of the box structures 9, 9 previously described. A pin 54 extending through the aperture 15 of the respective extension 13 forms the pivotal mounting for the cylinder. The relative position of the hydraulic cylinder 53 is well illustrated in Figure 2. Through the medium of these cylinders the loader boom may be elevated and lowered around the axis of the shaft 33.

The bucket 36, as previously described, is pivotally supported on the arms 31 and 32 for angular movement about the common axis of the pins 35. When picking up earth, stone or other material the arms 31 and 32 will be in the position shown in Figures 1 and 3, and the bucket or scoop in the position also shown in those figures. When the tractor is advanced with the loader elements in these positions the bucket or scoop will pick up the material in an obvious manner. Means is also provided for shifting the bucket to the load-supporting position illustrated in Figure 11. This means consists of an hydraulic cylinder 55, the rear end of which is pivotally attached to the angle bar 39 by means of a pin 56 which extends through bosses 57 and 58 on the inner sides respectively of a bracket arm 59 and of the upright flange 61 of an angle bar 62, one end of the bar and the bracket being secured to the cross bar 39, as shown in Figure 9. The rear apertured end of the cylinder 55 lies between the bosses 57 and 58 and is secured pivotally in position by the pin 56. The outer end of the plunger 63 of the hydraulic cylinder 55 is pivotally connected by a pin 64 to and between a pair of arms 65, 65, see Figure 13, which are secured to a shaft 66 journaled in a bearing 67 at the forward end of the angle bar 62. A pair of arms 68, 68 is attached to the opposite end of the shaft 66, and the rear ends of these arms are pivotally connected by a pin 69 with a link 71. This link extends forwardly and is connected at its forward end by a pin 72 to and between bosses 73, 73 which project from the back of the bucket or scoop. When the plunger 63 is retracted, the linkage which connects the plunger to the bucket and which includes the elements set forth immediately above will draw the bucket into the position shown in Figure 11.

In Figure 21, we have illustrated a modified bucket control which eliminates the cylinder 55 and associated parts and which utilizes gravity in the dumping operation. In this case, when the bucket is in the upright position, as in Figure 11, a lug 48 at the back of the bucket engages a latch 74 on a rod 75 which, as best shown in Figure 22, is journaled above the cross bar 38 in an upwardly projecting flange 76 on the latter and in a bearing 77 on the frame member 31. A spring confined under tension between a collar 78 on the end of the rod 75 and the flange 76 tends to hold the rod in a position wherein the latch 74 will occupy an advanced position in which it may engage the lug 48 of the bucket. The rod 75 may be turned to withdraw the latch 74 to release the bucket by means of an upstanding arm 79 on the rod 75 and a cable 81 which extends rearwardly from the upper end of the arm 79 to the operator's position on the tractor. The bucket may be brought into the upright position by backing the tractor while the forward edge of the bucket is in engagement with the ground and simultaneously lowering the boom so that in effect the bucket is rolled on the ground into the desired position in which the latch 74 engages the lug 48.

When the plunger 63 is projected from the cylinder 55 by hydraulic pressure the associated linkage will move the bucket into the dumping position shown in Figure 12; or the bucket moving to this position by gravity from the upright position of Figure 11 will draw the plunger, if free from hydraulic resistance, from the cylinder. In either case, the movement of the bucket will be terminated by contact of the lugs 47 with the arms 31 and 32, and the resulting impact shock will tend to free the surfaces of the bucket from adhering material and will afford a clean dumping of the latter from the bucket. The impact of the lugs 46 with the said arms will have a similar tendency to free the surfaces of the bucket from adhering matter.

The bulldozer unit comprises a pair of arms 82, 82 which are positioned one at each side of the fixed frame of the attachment described above. The rear ends of the arms are pivotally supported on the ends of a shaft 83 clamped by U bolts 84, 84 in the socket boxes 8, 8 which, as previously described, are secured to the rear end sections 6, 6 of the frame. The arms 82, 82 are connected toward their rear ends by a transverse bar 85 and at their opposite ends by a transverse bracket member 86, this latter member being shown in Figure 16. Brackets 87, 87 and 88, 88 reinforce the connection between the bracket member 86 and the arms 82 and afford a rigid structural connection. As illustrated in Figure 16 the bracket member 86 has upper and lower forwardly projecting flanges 89 and 91, and these flanges are provided with aligned sets of apertures 92, 92 and 93, 93 for reception of pins 94, 94, Fig. 18, by means of which a bulldozer blade 95 may be attached to the bracket member. As shown in Figure 16 the blade 95 is provided with rearwardly projecting lugs 96, 96 apertured for reception of the pins 94. By reference to Figure 15 it will be noted that by interposing links 97 between the blade and the bracket 86 the blade may be made to assume an angular position with respect to the plane of the bracket 86.

The arms 82, 82 with the cross bar 85 and the bracket 86 form a rigid structure which may be adjusted angularly about the axis of the shaft 83 through the medium of the hydraulic cylinder and plunger units 53, 53, see Figure 14, which when disconnected from the loader boom and tilted downwardly may be pivotally attached to brackets 98, 98 at the back of the bracket member 86, as best shown in Figure 15. By actuation of the plungers 63 the bulldozer blade may be moved between relatively depressed and elevated positions as required for the particular grading operation. It will be noted that the thrust imposed upon the arms 82 when the blade 95 is in operation is transmitted through the frame side members 1 and 2 to the longitudinal frame members 28 and 29 of the tractor. These frame members are supported at their rear ends on the housing 101 of the differential 102 of the rear axle assembly of the tractor. This connection is by way of U bolts 103, 103 which embrace the opposite ends of the housing 101 and are secured in flanges 104, 104 at the rear ends of the respective side frame members 28 and 29. Blocks 105 are interposed between the flanges 104 and the housing 101, and the outer end of the flanges carry rigid pads 106 which seat against the sides of the said housing so as to provide, with the blocks 105, a stable and secure seat for the flanges on the housing. As previously stated the rearward thrust imposed upon the members 28 and 29 by the bulldozer attachment are thus in turn directly imposed upon the housing 101.

It will be apparent from the foregoing description that the bulldozer and loader units operate independently through the medium of the common actuating cylinders 53, 53. When the bulldozer function is to be performed the loader unit, including the boom, may be removed from the shaft 33 and detached from the tractor; or the brackets 18 and 19 with the entire loader unit may be detached by removal of the pins 16 and 17. With the cylinders 53, 53 then operatively connected to the bracket member 86 at the forward end of the arms 82 the tractor is conditioned for bulldozing operations. When the loader is to be employed it is not necessary to remove the arms 82 and the associated parts, it being sufficient to elevate the arms to the position shown in Figure 3 in which the unit, exclusive of the blade 95 which has been removed by withdrawal of the pins 94, may be suported by links 107 connected respectively to opposite sides of the tractor frame by means of bolts 108 and to the brackets 98 of the bulldozer unit, as clearly shown in Figure 3. In this inoperative position, however, the bracket member 86 of the unit functions as an abutment to brace the boom of the loader unit when the latter is in the operative position shown in Figure 3, it being noted therein, and also by reference to the enlarged sectional view of Figure 4, that the cylindrical pads 45 on the cross bar 39 of the rigid boom of the loader unit engage the forward face of the bracket 86 when the boom is in the lower operative position shown in Figure 3. In this way the rearward thrust imposed upon the boom structure of the loader attachment when the scoop is being advanced into the material to be loaded is transmitted in substantial part through the arms 82 of the bulldozer unit to the frame members 3 and 4 and thence through the beams 28, 29 to the housing 101, as previously set forth.

The hydraulic system controlling the operation of the cylinders 53 and 55 form no essential part of the present invention. In general the system comprises a pump 111 operated from the engine 112 of the tractor and operatively connected with a make up tank 113 for the hydraulic fluid. The pump 111 discharges the hydraulic medium through a central valve unit 114 and through ducts 115 to the cylinders 53, 53; and through a duct system 116 which connects the valve unit to the cylinder 55. The valve unit 114 may be adjusted manually and selectively through levers 117 and 118 and connecting rods 119 and 121 to actuate the cylinder units 53 and 55 as required.

The hydraulic system includes a shock absorbing unit 122, as shown in Figure 19, which functions to absorb the shocks imposed upon the mechanism through the hydraulic system when the bucket 36 is in the elevated position and when, by reason of a sudden interruption of the flow of fluid in the system, or by reason of travel of the tractor over uneven ground, the hydraulic system and associated mechanical parts are subjected to unavoidable shocks and strains. This shock absorbing unit is of the character described in our co-pending application Serial Number 347,356 filed April 7, 1953 and consists generally of a cylinder casing 123, a plunger 124, one end of which projects through an end wall of the housing 122 and which is normally held in a retracted position in the housing by means of a spring 125. A port 126 in the housing is connected by way of a pipe 127 with the hydraulic system as indicated in Figure 20. Excessive pressure in the hydraulic system will cause the plunger to move outwardly from the housing against the pressure of the spring 125 to thereby absorb and to neutralize the effects of sudden pressure surge in the system.

We claim:

1. In a tractor, a main frame, a secondary frame mounted on the main frame and comprising members at opposite sides respectively of the main frame, each said member having front and rear anchor plates attached to the proximate side of the main frame and an intermediate section uniting and supported by said plates, a bracket mounted on the intermediate section of each member, a shaft journaled in the upper ends of said brackets, a shaft mounted in the rear anchor plates of the secondary frame, a bulldozer yoke comprising arms journaled respectively on the ends of the last named shaft and extending forwardly at the sides of the main frame, said yoke having at its forward end means for detachably mounting a blade, a loader boom comprising arms secured to the shaft first named and extending forwardly from the latter, said boom being adjustable in vertical planes about the axis of said shaft and straddling the bulldozer yoke when said boom is in a depressed position and said yoke is in a raised inoperative position, hydraulic cylinder means pivotally attached to the secondary frame, means for operatively connecting the cylinder means selectively and individually to the boom and yoke for forcibly traversing said boom and yoke about the axes of their respective shafts, and means for detaching the boom from said tractor when said cylinder is connected to said yoke.

2. A tractor according to claim 1 including means for rigidly uniting the brackets independently of the other elements of the secondary frame.

3. A tractor according to claim 2 wherein the brackets are detachably secured to the said intermediate members of the secondary frame, said brackets with their uniting means being separable as a unit from the said frame.

4. A tractor according to claim 3 including means for rigidly uniting the front anchor plates independently of the main frame and the bracket unit.

5. A tractor according to claim 1 including a loader bucket pivotally attached to the forward end of the said boom, and hydraulic power means carried by the boom for traversing the bucket about its pivotal axis.

6. A tractor according to claim 1 including means for supporting the forward end of the said yoke in elevated inoperative position on the main frame.

7. A tractor according to claim 6 including means at the forward end of the yoke for forming an abutment for the said boom when the yoke occupies the said elevated inoperative position, and the boom occupies a depressed operative position, whereby rearward thrust on the bucket and boom are transmitted through the yoke to the said main frame.

8. An attachment for tractors having a longitudinal main frame, said attachment comprising a pair of side members, each having front and rear anchor plates and adapted for rigid attachment through said plates to the opposite sides respectively of said frame, means rigidly connecting the front anchor plate of one of the members to the front anchor plate of the other member, each said member having an intermediate section uniting the front and rear plates, a bracket mounted on each intermediate member, means for rigidly uniting the said brackets independently of the side members, means on the rear anchor plates for mounting a transverse shaft as a support for a bulldozer yoke, and means at the upper ends of the pedestal for mounting a transverse shaft as a support for a loader boom.

9. An attachment according to claim 8 including means for detachably securing the brackets to the respective intermediate members.

10. An attachment according to claim 9 including a bulldozer yoke pivotally supported on the first named shaft, and a loader boom pivotally supported on the second named shaft.

11. An attachment according to claim 8 wherein each intermediate section comprises upright relatively spaced longitudinal walls, and pins detachably mounted in said walls and constituting means for releasably anchoring the brackets to said sections.

References Cited in the file of this patent

UNITED STATES PATENTS

| | | |
|---|---|---|
| 2,163,662 | Buffington | June 27, 1939 |
| 2,182,781 | Andersen et al. | Dec. 12, 1939 |
| 2,233,237 | Andersen et al. | Feb. 25, 1941 |
| 2,339,518 | Reisser | Jan. 18, 1944 |
| 2,537,010 | Andersen | Jan. 9, 1951 |
| 2,660,816 | Maxwell | Dec. 1, 1953 |
| 2,708,526 | Ulrich | May 17, 1955 |
| 2,755,572 | Pilch | July 24, 1956 |

FOREIGN PATENTS

| | | |
|---|---|---|
| 632,890 | Great Britain | Dec. 5, 1949 |